United States Patent
Toda et al.

(10) Patent No.: US 10,220,764 B2
(45) Date of Patent: Mar. 5, 2019

(54) VEHICULAR HEAD-LIGHTING SYSTEM

(71) Applicant: Koito Manufacturing Co., Ltd., Tokyo (JP)

(72) Inventors: Atsushi Toda, Shizuoka (JP); Yutaka Nakanishi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 129 days.

(21) Appl. No.: 15/353,898

(22) Filed: Nov. 17, 2016

(65) Prior Publication Data

US 2017/0136940 A1  May 18, 2017

(30) Foreign Application Priority Data

Nov. 17, 2015 (JP) ................................ 2015-224847

(51) Int. Cl.
*B60Q 1/14* (2006.01)
*B60Q 1/08* (2006.01)
(Continued)

(52) U.S. Cl.
CPC ............. *B60Q 1/08* (2013.01); *B60Q 1/0023* (2013.01); *B60Q 1/14* (2013.01); *B60Q 1/143* (2013.01);
(Continued)

(58) Field of Classification Search
CPC .......... B60Q 1/08; B60Q 1/0023; B60Q 1/14; B60Q 1/16; B60Q 1/143; B60Q 2300/056; B60Q 2300/41; B60Q 2300/43
See application file for complete search history.

(56) References Cited

U.S. PATENT DOCUMENTS

| 8,475,023 B2 * | 7/2013 | Tsutsumi | ............ H01L 25/0753 362/539 |
| 8,550,677 B2 * | 10/2013 | Tsutsumi | ............ H01L 25/0753 362/539 |

(Continued)

FOREIGN PATENT DOCUMENTS

| DE | 102008060949 A1 | 9/2009 |
| EP | 2266838 A1 | 12/2010 |
| WO | 2014-091919 A1 | 6/2014 |

OTHER PUBLICATIONS

European Search Report from European Pat. App. No. 16198973.6, dated Mar. 31, 2017.
(Continued)

*Primary Examiner* — Peter D Nolan

(57) ABSTRACT

A vehicular head-lighting system includes: an identification unit that from a plurality of zones defined in front of a driver's vehicle identifies a zone in which a frontward vehicle is located; and a selection unit that in accordance with the zone identified by the identification unit selects from the plurality of light distribution patterns a light distribution pattern that is to be formed. The selection unit selects the low beam light distribution pattern when the identification unit identifies the frontward vehicle as being located in the first zone, selects the adaptive high beam light distribution pattern when the identification unit identifies the frontward vehicle as being located in the second zone, and maintains the currently selected light distribution pattern when the identification unit identifies the frontward vehicle as being located in the transitional zone.

4 Claims, 12 Drawing Sheets

(51) Int. Cl.
*B60Q 1/00* (2006.01)
*B60Q 1/16* (2006.01)

(52) U.S. Cl.
CPC .......... *B60Q 1/16* (2013.01); *B60Q 2300/056* (2013.01); *B60Q 2300/41* (2013.01); *B60Q 2300/42* (2013.01); *B60Q 2300/43* (2013.01)

(56) References Cited

U.S. PATENT DOCUMENTS

| | | | | |
|---|---|---|---|---|
| 8,870,424 | B2* | 10/2014 | Tatara | B60Q 1/12 315/81 |
| 9,469,242 | B2* | 10/2016 | Imaeda | B60Q 1/143 |
| 9,487,123 | B2* | 11/2016 | Mizuno | B60Q 1/143 |
| 9,550,448 | B2* | 1/2017 | Tanaka | F21S 41/143 |
| 9,713,979 | B2* | 7/2017 | Imaeda | B60Q 1/085 |
| 9,944,220 | B2* | 4/2018 | Takagaki | B60Q 1/08 |
| 9,956,901 | B2* | 5/2018 | Nakanishi | B60Q 1/143 |
| 2011/0025209 | A1* | 2/2011 | Nakanishi | B60Q 1/12 315/82 |
| 2011/0121731 | A1* | 5/2011 | Tsutsumi | H01L 25/0753 315/77 |
| 2011/0121732 | A1* | 5/2011 | Tsutsumi | H01L 25/0753 315/77 |
| 2013/0039080 | A1* | 2/2013 | Yamazaki | B60Q 1/085 362/465 |
| 2013/0207543 | A1* | 8/2013 | Tatara | B60Q 1/12 315/81 |
| 2015/0028742 | A1* | 1/2015 | Imaeda | B60Q 1/143 315/82 |
| 2015/0149045 | A1* | 5/2015 | Mizuno | B60Q 1/1423 701/49 |
| 2015/0239392 | A1* | 8/2015 | Mizuno | B60Q 1/143 362/466 |
| 2015/0251586 | A1* | 9/2015 | Imaeda | B60Q 1/12 362/466 |
| 2015/0377445 | A1* | 12/2015 | Chuang | B60Q 1/143 362/465 |
| 2016/0167566 | A1* | 6/2016 | Tanaka | F21S 41/143 315/82 |
| 2016/0250964 | A1* | 9/2016 | Takagaki | B60Q 1/08 362/466 |
| 2017/0043702 | A1* | 2/2017 | Park | B60Q 1/143 |

OTHER PUBLICATIONS

Office Action on corresponding CN application No. 201610971333.8, dated Jan. 11, 2019.

* cited by examiner

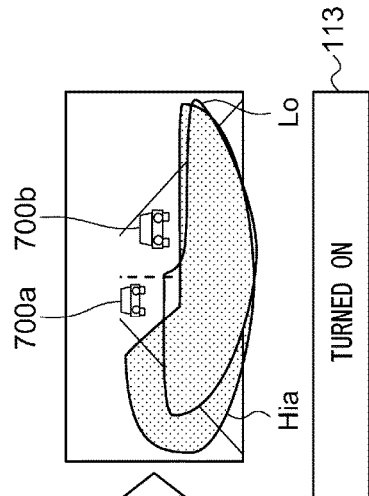
FIG. 10C
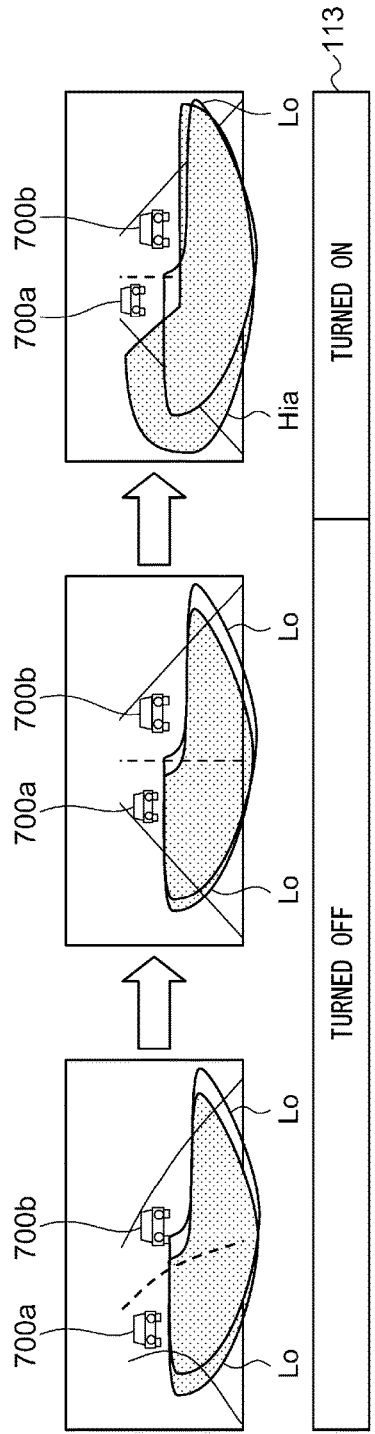
FIG. 10B
FIG. 10A
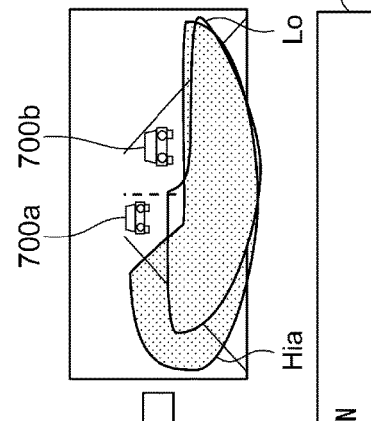
FIG. 10D
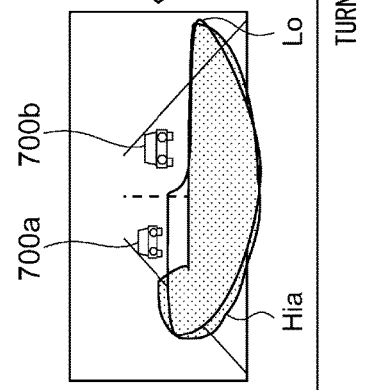
FIG. 10E
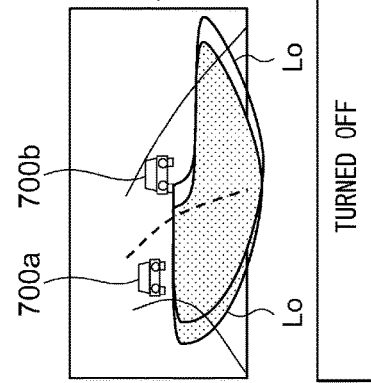
FIG. 10F

VEHICULAR HEAD-LIGHTING SYSTEM

INCORPORATION OF PRIORITY APPLICATION BY REFERENCE

This application is based upon and claims the benefit of priority from the prior Japanese Patent Application No. 2015-224847, filed on Nov. 17, 2015, the entire contents of which are incorporated herein by reference.

BACKGROUND OF THE INVENTION

1. Field of the Invention

The present invention relates to vehicular head-lighting systems, and more particularly, to vehicular head-lighting systems employed in vehicles such as automobiles.

2. Description of the Related Art

Vehicular lamp systems configured to dynamically control light distribution so as to match the non-illuminated areas to cars running ahead, or to oncoming cars, in front of a driver's vehicle (hereinafter, generically referred to as "frontward vehicles") have been proposed. This sort of light distribution control is sometimes referred to as adaptive driving beam (ADB) control. In ADB control, an appropriate light distribution pattern is selected based on results of detecting frontward vehicles through vehicle detection means such as a camera, or on the traveling state of the driver's vehicle. The vehicular lamp is controlled so as to form the selected light distribution pattern. The process thus is reiterated in a series, with the result that the light distribution pattern is changed as the situation requires. Automatic adjustment of light distribution in this way is beneficial both in securing an extensive field of view ahead of the driver's vehicle, and in reducing glare toward frontward vehicles.

However, depending on the motoring venue, automatic switching of light distribution patterns by means of ADB control can occur with remarkable frequency. Excessively frequent change in light distribution could cause it to be felt in the driver's vehicle or the frontward vehicle as a worry or other sense that something is wrong.

In particular, if high-beam/low-beam switching is iterated to excess, because such switching ordinarily accompanies the high beam indicator turning on and off, to the driver it can look as though the indicator is flashing inexplicably. Despite the fact that this flashing of the indicator is the result of normal light distribution switching in response to the circumstances, because it might make the driver misunderstand that the flashing is being caused by some sort of abnormality and feel uneasy, it is unwelcome.

SUMMARY OF THE INVENTION

An object of the present invention, brought about taking such circumstances into consideration, is to make available a vehicular lamp system that while maintaining the preexisting advantages of ADB control, keeps excessively frequent change of light distribution under control.

To address the afore-discussed issues, the vehicular head-lighting system according to an embodiment of the present invention comprises: vehicular head-lighting enabled for forming a plurality of light distribution patterns; an identification unit that from a plurality of zones defined in front of a driver's vehicle identifies a zone in which a frontward vehicle is located; and a selection unit that in accordance with the zone identified by the identification unit selects from the plurality of light distribution patterns a light distribution pattern that is to be formed. The plurality of zones includes a first zone defined at a first vehicle widthwise end, a transitional zone defined along a second vehicle widthwise end and adjoining the first zone, and a second zone defined along the second vehicle widthwise end and adjoining the transitional zone. The plurality of light distribution patterns includes a low beam light distribution pattern and an adaptive high beam light distribution pattern having an illuminated area at least in the first zone, and derived by excluding frontward-vehicle area from a high beam light distribution pattern. The selection unit selects the low beam light distribution pattern when the identification unit identifies the frontward vehicle as being located in the first zone, selects the adaptive high beam light distribution pattern when the identification unit identifies the frontward vehicle as being located in the second zone, and maintains the currently selected light distribution pattern when the identification unit identifies the frontward vehicle as being located in the transitional zone.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 10A-10F are diagrams illustrating a relationship between a leading vehicle and a light distribution pattern according to an embodiment of the invention;

DETAILED DESCRIPTION OF THE INVENTION

Figure 1:
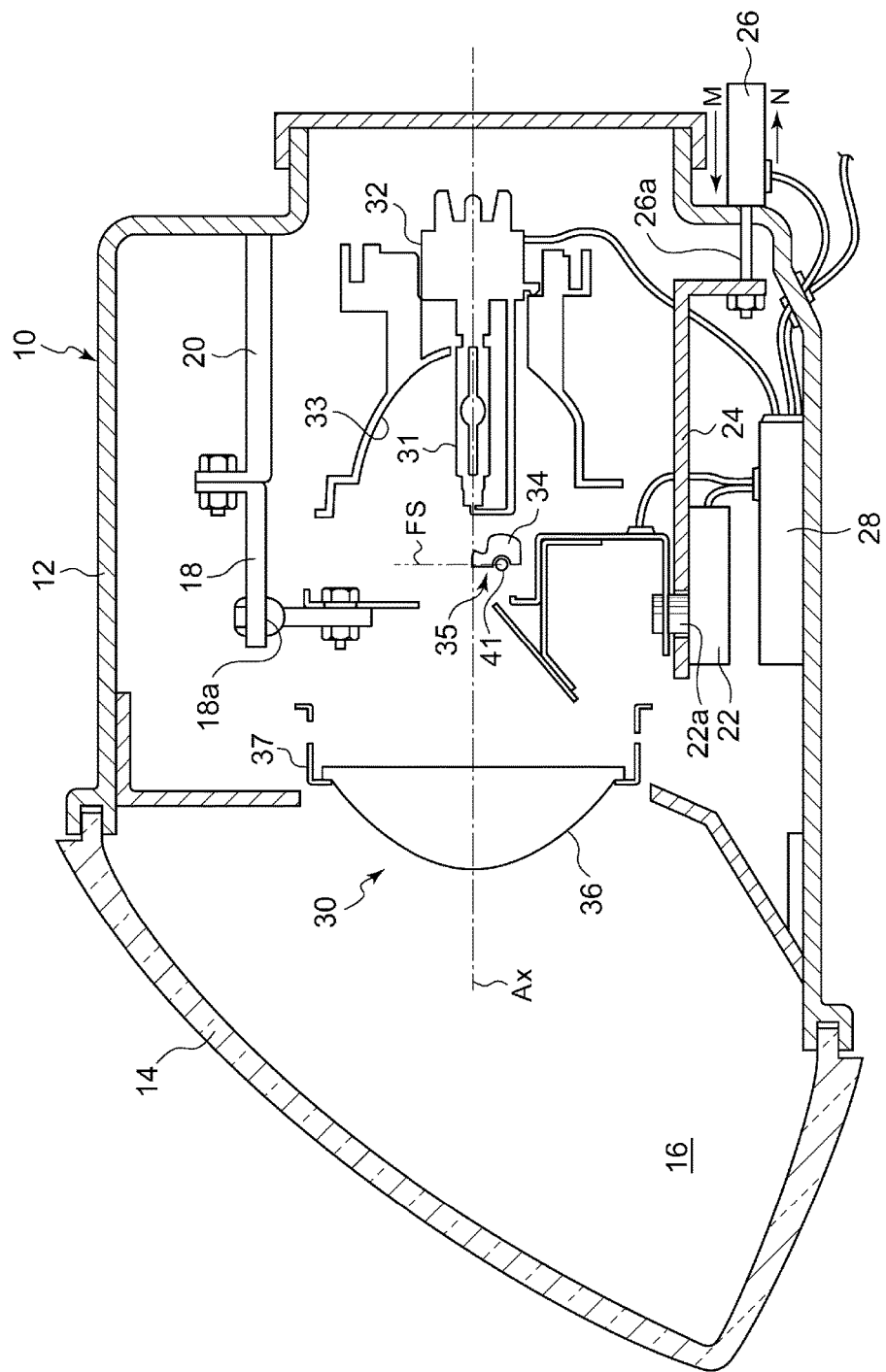
FIG. 1 is a schematic sectional view showing an internal structure of an automotive headlamp used in a light distribution control system according to an embodiment of the invention.

The invention will now be described by reference to the preferred embodiments. This does not intend to limit the scope of the present invention, but to exemplify the invention.

The vehicular head-lighting system according to an embodiment of the present invention includes vehicular head-lighting enabled for forming a plurality of light distribution patterns; an identification unit that from a plurality of zones defined in front of a driver's vehicle identifies a zone in which a frontward vehicle is located, based on detection results by a frontward vehicle detection unit; and a selection unit that in accordance with the zone identified by the identification unit selects from the plurality of light distribution patterns a light distribution pattern that is to be formed. The plurality of zones includes a first zone defined at a first vehicle widthwise end, a transitional zone defined along a second vehicle widthwise end and adjoining the first zone, and a second zone defined along the second vehicle widthwise end and adjoining the transitional zone. The plurality of light distribution patterns includes a low beam light distribution pattern and an adaptive high beam light distribution pattern having an illuminated area at least in the first zone, and derived by excluding frontward-vehicle area from a high beam light distribution pattern. The selection unit selects the low beam light distribution pattern when the identification unit identifies the frontward vehicle as being located in the first zone, selects the adaptive high beam light distribution pattern when the identification unit identifies the frontward vehicle as being located in the second zone, and maintains the currently selected light distribution pattern when the identification unit identifies the frontward vehicle as being located in the transitional zone.

According to the embodiment, the first zone, the second zone, and the transitional zone sandwiched by these zones are defined in front of the driver's vehicle. The first zone is defined at the left end or right end, and the second zone is defined toward the center or at the opposite end with respect to the first zone. When the frontward vehicle is located in the first zone, the low beam light distribution pattern is selected. When the frontward vehicle is located in the second zone, the adaptive high beam light distribution pattern (e.g., one-sided high beam light distribution pattern in which the non-illuminated area is variable) is selected. When the frontward vehicle is located in the transitional zone, the currently selected light distribution pattern is maintained.

For this reason, the low beam light distribution pattern is maintained when the vehicle enters the transitional zone from the first zone. When the frontward vehicle moves further in the same direction from the transitional zone and reaches the second zone, the low beam light distribution pattern is switched to the adaptive high beam light distribution pattern. When the frontward vehicle moves in the opposite direction and returns to the first zone from the transitional zone, the low beam light distribution pattern continues to be turned on during the reciprocal movement between the first zone and the second transitional zone. Further, when the frontward vehicle enters the transitional zone from the second zone, the adaptive high beam light distribution pattern is maintained. When the frontward vehicle moves further in the same direction from the transitional zone and reaches the first zone, the adaptive high beam light distribution pattern is switched to the low beam light distribution pattern. When the frontward vehicle moves in the opposite direction and returns to the second zone from the transitional zone, the adaptive high beam light distribution pattern is maintained during the reciprocal movement between the second zone and the transitional zone.

Thus, the light distribution pattern is properly changed depending on the position of the frontward vehicle when the frontward vehicle moves relatively heavily from side to side. Otherwise, the original light distribution pattern is maintained. Accordingly, excessively frequent changes in light distribution is inhibited while the related-art advantages of ADB control such as securing of a deep field of view ahead the driver's vehicle and reduction of the glare for the frontward vehicle are enjoyed. This can reduce the discomfort felt in the driver's vehicle or the frontward vehicle and inhibit undesired flashing of the high beam indicator as described above.

The vehicular head-lighting system may include an update unit that updates the frontward-vehicle area based on detection results by the frontward vehicle detection unit, and an adjustment unit that adjusts the form or shape of the adaptive high beam light distribution pattern so as to exclude the updated frontward-vehicle area. In this way, the non-illuminated area can be suited to the frontward vehicle while the adaptive high beam light distribution pattern is being selected.

The vehicular head-lighting may be a pair of vehicular lamps arranged on the left and right of the vehicle. For each of the pair of vehicular lamps, the first zone may be defined outside the transitional zone widthwise along the vehicle. In this way, the light distribution pattern of each of the pair of vehicular lamps can be changed when the frontward vehicle moves relatively heavily and, otherwise, the original light distribution pattern can be maintained, as described above.

A detailed description will now be given of the embodiments of the present invention with reference to the attached drawings.

FIG. 1 is a schematic sectional view showing an internal structure of an automotive headlamp 10 used in a light distribution control system according to an embodiment of the invention. The automotive headlamp 10 shown in FIG. 1 is a variable light distribution headlamp arranged at the left and right ends of the vehicle in the direction of vehicle width. The structure of the automotive headlamp 10 is substantially identical on the left side and on the right side. The automotive headlamp 10 is configured such that a plurality of light distribution patterns including the low beam light distribution pattern and the high beam light distribution pattern are switchable.

The automotive headlamp 10 includes a lamp chamber 16 formed by a lamp body 12 that opens to a space in front of the vehicle, and a translucent cover 14 covering the opening of the lamp body 12. A lamp unit 30 for projecting light to a space in front of the vehicle is accommodated in the lamp chamber 16. A lamp bracket 18 having a pivot mechanism 18a that serves as a pivotal center of the lamp unit 30 is formed in a part of the lamp unit 30. The lamp bracket 18 is connected to a body bracket 20 provided to stand on the interior wall surface of the lamp body 12 by a tightening member such as a screw. Therefore, the lamp unit 30 is fixed at a predetermined position in the lamp chamber 16 but can also be variably oriented to incline forward or backward around the pivot mechanism 18a.

A rotating shaft 22a of a swivel actuator 22 for forming an adaptive front-lighting system (AFS) for illuminating the direction of travel while the vehicle is traveling on a curved road is fixed underneath the lamp unit 30. The swivel actuator 22 swivels the lamp unit 30 around the pivot mechanism 18a in alignment with the direction of travel based on the data for steering provided by the vehicle, shape data on the road traveled supplied from a navigation system, and relative positions of the frontward vehicle and the driver's vehicle. As a result, the illumination range of the lamp unit 30 is directed ahead of the curve of the curved road instead of the directly in front of the vehicle so as to improve the field of view of the driver. For example, the swivel actuator 22 is comprised of a stepping motor. If the swivel angle is fixed, a solenoid may be used.

The swivel actuator 22 is fixed to a unit bracket 24. A leveling actuator 26 provided outside the lamp body 12 is connected to the unit bracket 24. For example, the leveling actuator 26 is comprised of a motor for expanding and contracting a rod 26a in directions indicated by arrows M and N. When the rod 26a is expanded in the direction indicated by the arrow M, the lamp unit 30 is swung around the pivot mechanism 18a so as to incline backward. Conversely, when the rod 26a is contracted in the direction indicated by the arrow N, the lamp unit 30 is swung around the pivot mechanism 18a so as to incline forward. When the lamp unit 30 inclines backward, leveling adjustment is made to direct the light axis upward. When the lamp unit 30 inclines forward, leveling adjustment is made to direct the light axis downward. By effecting leveling adjustment as described above, the light axis is adjusted to suit the vehicle orientation. As a result, the distance of reach of forward illumination by the automotive headlamp 10 can be adjusted to be optimum.

Leveling adjustment can be performed depending on the orientation of the vehicle traveling. For example, the lamp unit 30 is made to incline backward when the vehicle in travel is accelerated. Conversely, the lamp unit 30 is made to incline forward when the vehicle is decelerated. Accordingly, the direction of illumination by the automotive headlamp 10 moves up and down depending on the orientation of the vehicle and the distance of illumination is extended or reduced accordingly. Thus, by performing leveling adjustment of the lamp unit 30 according to the vehicle orientation on a real time basis, the distance of reach of forward illumination can be optimally adjusted even while the vehicle is traveling. This may be referred to as "autoleveling."

A lamp-side controller 28 for controlling the lamp unit 30 to be turned on or off and controlling formation of a light distribution pattern is provided on the interior wall surface of the lamp chamber 16 and, for example, below the lamp unit 30. The lamp-side controller 28 also controls the swivel actuator 22, the leveling actuator 26, etc.

The lamp unit 30 may be provided with an aiming adjustment mechanism. For example, an aiming pivot mechanism that serves as a pivotal center during aiming adjustment is provided at a joint between the rod 26a of the leveling actuator 26 and the unit bracket 24. A pair of aiming adjustment screws that advance and recede in the longitudinal direction of the vehicle are provided at an interval at a joint between the body bracket 20 and the lamp bracket 18. For example, by advancing the two aiming adjustment screws forward, the lamp unit 30 inclines forward around the aiming pivot mechanism so that the light axis is adjusted downward. Similarly, by receding the two aiming adjustment screws backward, the lamp unit 30 inclines backward around the aiming pivot mechanism so that the light axis is adjusted upward. By advancing the leftward aiming adjustment screw in the direction of vehicle width forward, the lamp unit 30 is turned rightward around the aiming pivot mechanism so that the light axis is adjusted rightward. By advancing the rightward aiming adjustment screw in the direction of vehicle width forward, the lamp unit 30 is turned leftward around the aiming pivot mechanism so that the light axis is adjusted leftward. Aiming adjustment is performed when the vehicle is shipped or inspected, or when the automotive headlamp 10 is exchanged. The automotive headlamp 10 is adjusted to a predetermined orientation as designed and light distribution pattern formation control according to the embodiment is performed with reference to the orientation.

Figure 2:
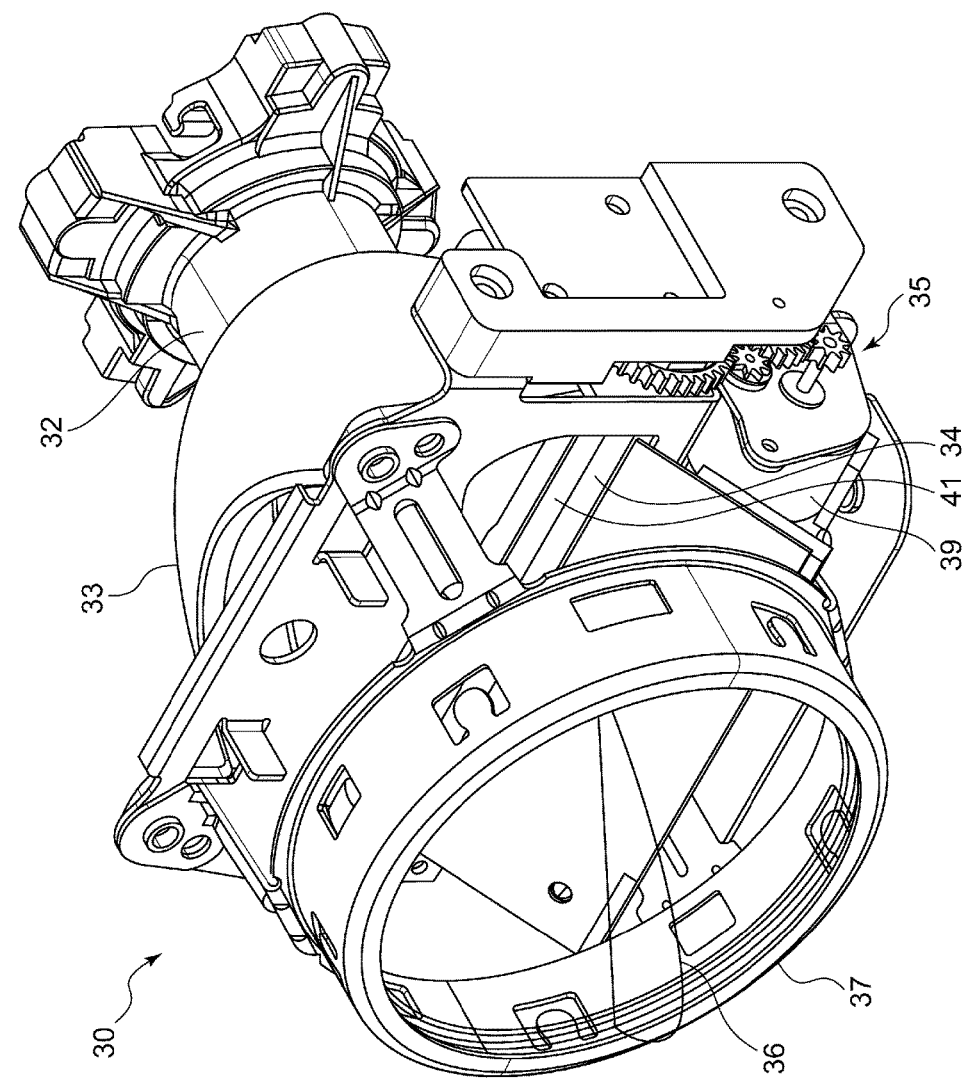
FIG. 2 is a perspective view illustrating a lamp unit.

FIG. 2 is a perspective view illustrating the lamp unit 30. As shown in FIGS. 1 and 2, the lamp unit 30 includes a light source 31, a light source mount 32, a reflector 33, a shade mechanism 35 including a rotating shade 34, a projection lens 36, and a lens holder 37 for supporting the projection lens 36. Illustration of the projection lens 36 is simplified in FIG. 2.

An incandescent bulb, halogen lamp, discharge lamp bulb, LED, or the like may be used for the light source 31. In this embodiment, an example where the light source 31 is comprised of a halogen lamp is shown. The light source 31 is mounted on the light source mount 32. The reflector 33 reflects the light emitted by the light source 31. Portions of the light from the light source 31 and the light reflected by the reflector 33 are directed to the projection lens 36 via the rotating shade 34.

Figure 3:
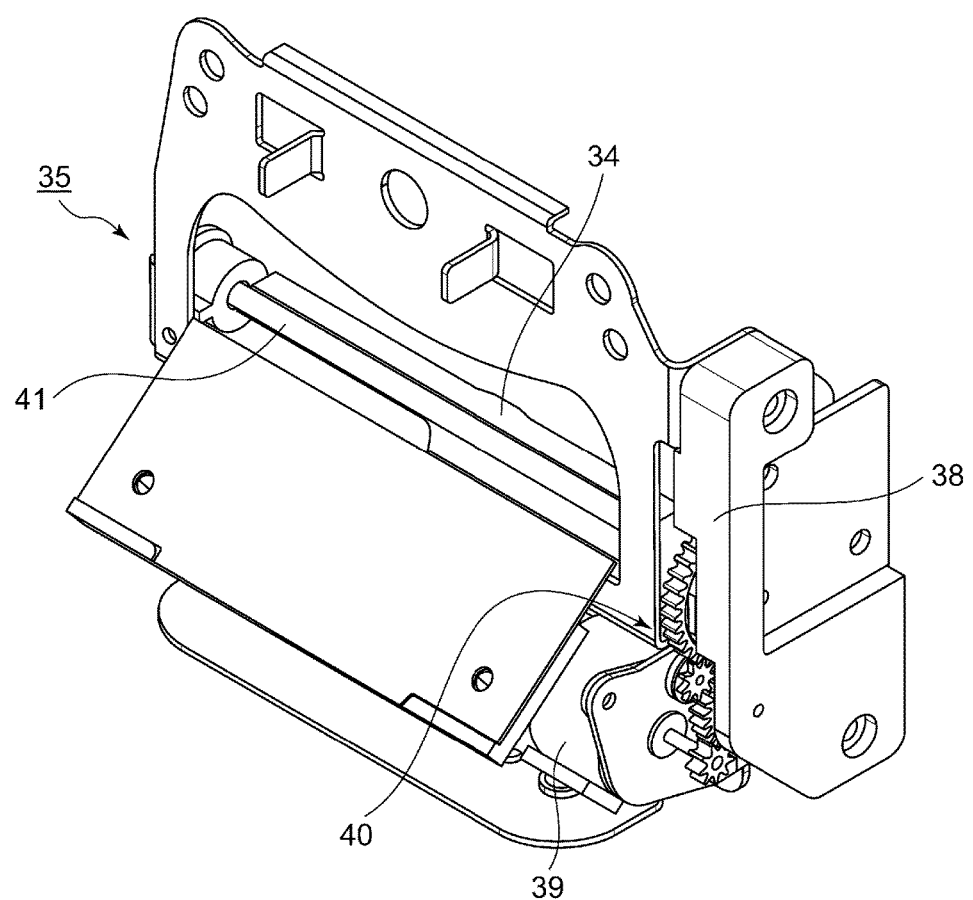
FIG. 3 is a perspective view illustrating a shade mechanism.

FIG. 3 is a perspective view illustrating the shade mechanism 35. FIG. 3 shows that the projection lens 36, lens holder 37, reflector 33, etc. are removed from the lamp unit 30 shown in FIG. 2. As shown in FIG. 3, the shade mechanism 35 includes a rotating shade 34 formed to be capable of shielding a portion of the light from the light source, a shade support 38 for supporting the rotating shade 34, a rotating shaft 41, a shade motor 39 as an actuator for driving the rotating shade 34 into rotation, a gear mechanism 40 for transmitting the rotation of the shade motor 39 to the rotating shade 34, and a shade position sensor (not shown) for detecting the position of rotation of the rotating shade 34. For example, the shade motor 39 may be a stepping motor. The rotation of the shade motor 39 is controlled by the lamp-side controller 28.

Figure 4:
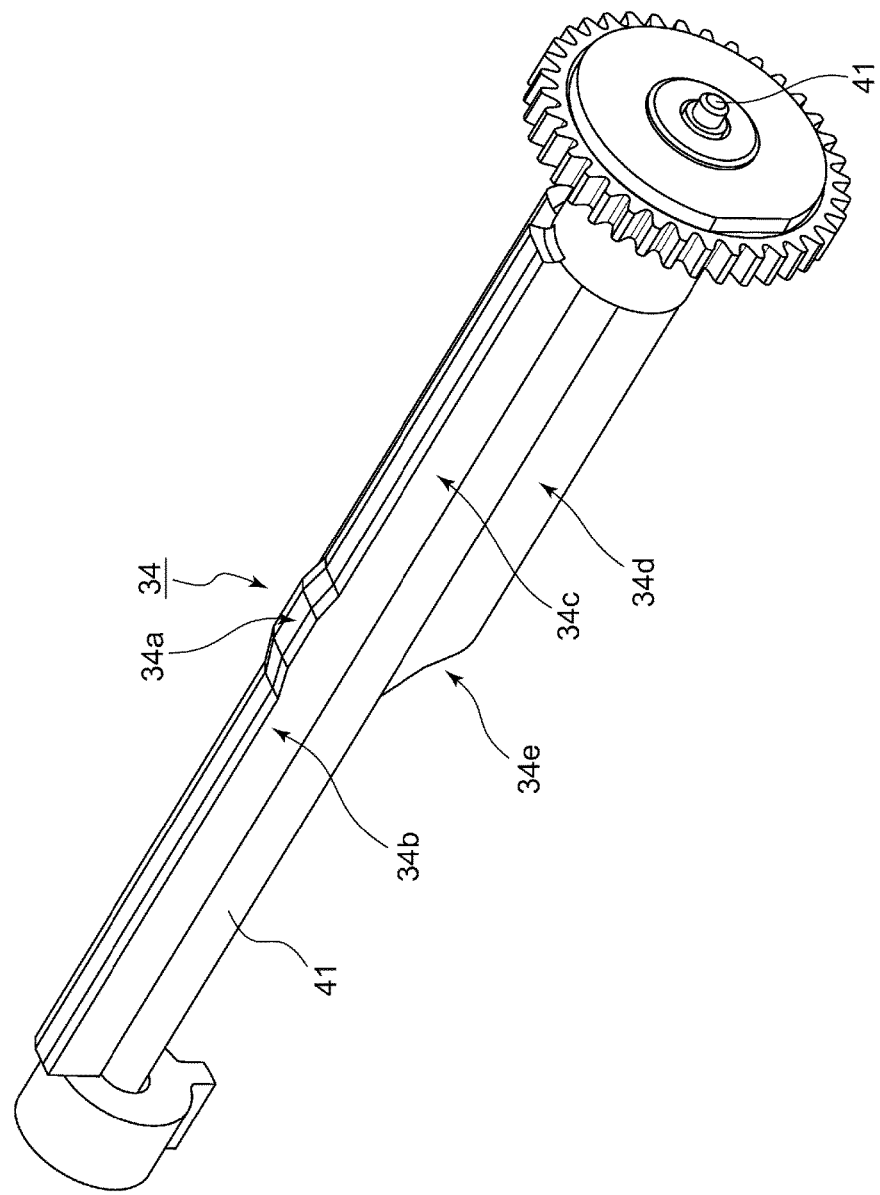
FIG. 4 is a perspective view illustrating a rotating shade.

FIG. 4 is a perspective view illustrating the rotating shade 34. The rotating shade 34 is comprised of a substantially semi-cylindrical member rotatable around the rotating shaft 41. The ridge line of the rotating shade 34 is designed so that the mode of shielding the light from the light source 31 and the reflector 33 is changed depending on the position of rotation.

More specifically, the rotating shade 34 is formed with a ridge line shape 34a for forming a low beam light distribution pattern (hereinafter, also referred to as "a low beam formation part 34a"), a ridge line shape 34b for forming a first passing light distribution pattern (hereinafter, also referred to as "a first passing formation part 34b"), a ridge line shape 34c for forming a high beam light distribution pattern (hereinafter, also referred to as "a high beam formation part 34c"), a ridge line shape 34d for forming a second passing light distribution pattern (hereinafter, also referred to as "a second passing formation part 34d"), a ridge line shape 34e for forming a first one-sided high beam light distribution pattern (hereinafter, also referred to as "a first one-sided high beam formation part 34e"), and a ridge line shape for forming a second one-sided high beam light distribution pattern (hereinafter, also referred to as "a second one-sided high beam formation part") in the stated order in the counterclockwise direction around the rotating shaft 41 in FIG. 4.

One of the six types of light distribution pattern formation parts described above can be moved to the position of the rear focal plane FS that includes the rear focal point of the projection lens 36 by driving the rotating shade 34 into rotation using the shade motor 39. The mode of shielding the light from the light source 31 and the reflector 33 is changed depending on the ridge line shape of the rotating shade 34 located on the rear focal plane FS.

The light transmitted through the rotating shade 34 is incident on the projection lens 36. The projection lens 36 is comprised of a plano-convex aspherical lens in which the front surface is convex and the rear surface is planar and projects an inverted image of a light source on the rear focal plane FS to a virtual vertical screen in front of the automotive headlamp. The projection lens 36 is arranged so that the light source 31 is located on the light axis Ax of the projection lens 36.

A description will now be given of the six types of light distribution patterns described above and the ridge line shapes of the rotating shade 34 for forming the respective light distribution patterns with reference to FIGS. 5 and 6.

Figure 5:
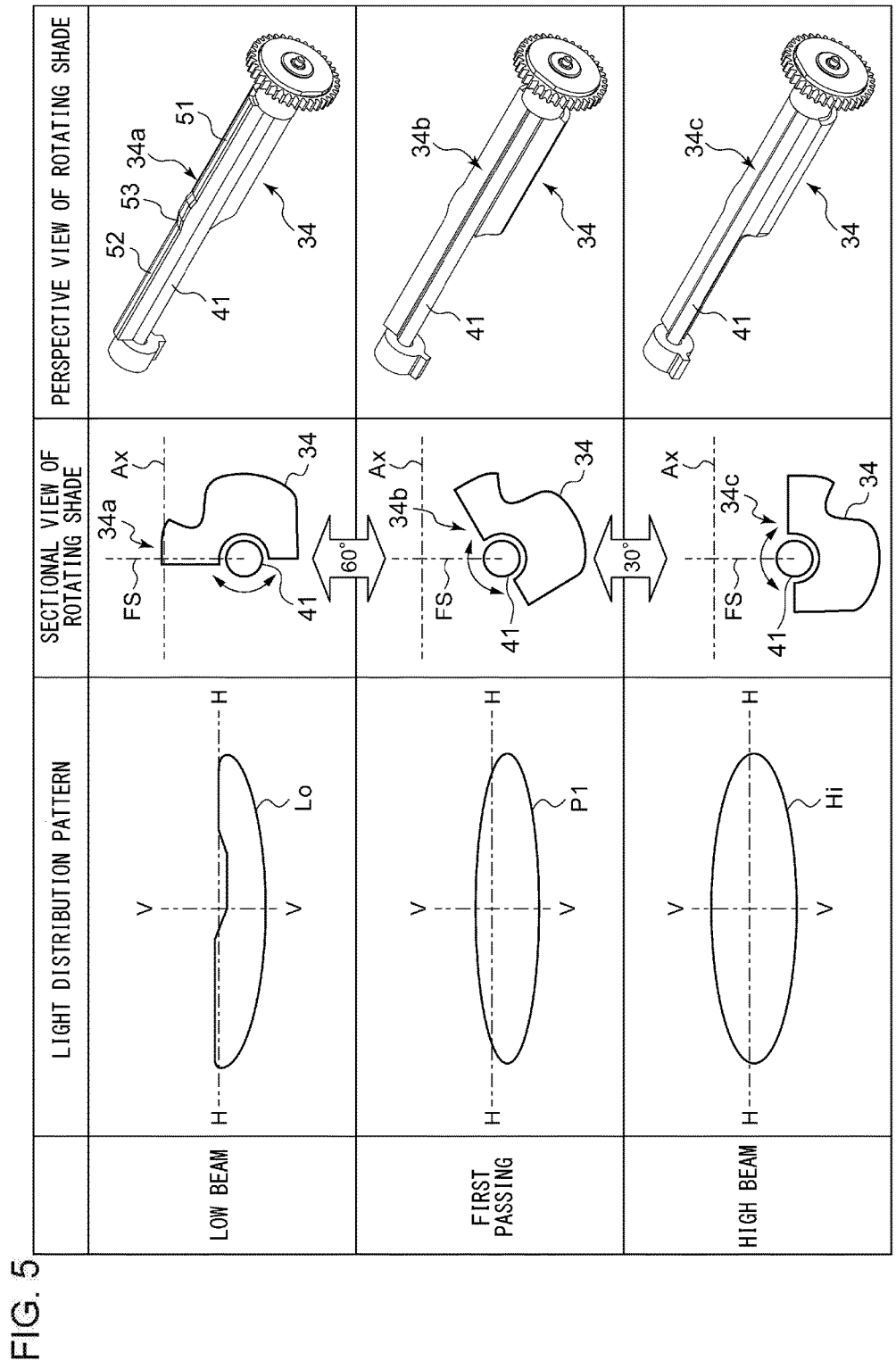
FIG. 5 is a diagram illustrating a light distribution pattern and a ridge line shape of the rotating shade for forming the light distribution pattern.

The top row of FIG. 5 shows a low beam light distribution pattern and the orientation of the rotating shade 34 occurring when the low beam light distribution pattern is formed (cross sectional view and perspective view). The low beam light distribution pattern Lo has, on the top end thereof, a cutoff line on the side of the oncoming traffic lane (oncoming traffic lane cutoff line), a cutoff line on the side of the driver's own lane (driver's lane cutoff line), and a diagonal cutoff line between the oncoming traffic lane cutoff line and the driver's lane cutoff line. The oncoming traffic lane cutoff line is to the right of the V-V line (vertical line) and extends parallel to the H-H line (horizontal line). The driver's lane cutoff line is to the left of the V-V line and extends parallel to the H-H line at a level higher than the oncoming lane cutoff line. The diagonal cutoff line connects the oncoming traffic lane cutoff line and the driver's lane cutoff line. The diagonal cutoff line extends leftward and upward at a tilt angle of 45° from the intersection between the oncoming traffic lane cutoff line and the V-V line.

The low beam formation part 34a of the rotating shade 34 includes an oncoming traffic lane cutoff line formation part 51 for forming the oncoming traffic lane cutoff line, a driver's lane cutoff line formation part 52 for forming the driver's lane cutoff line, and a diagonal cutoff line formation part 53 for forming the diagonal cutoff line. The oncoming traffic lane cutoff line formation part 51 and the driver's lane cutoff line formation part 52 are substantially planar portions extending in the axial direction of the rotating shade 34. The diagonal cutoff line formation part 53 is a projecting portion located between the oncoming traffic lane cutoff line formation part 51 and the driver's lane cutoff line formation part 52 and having an inclined surface.

The middle row of FIG. 5 shows a first passing light distribution pattern P1 and the orientation of the rotating shade 34 occurring when the first passing light distribution pattern is formed (cross sectional view and perspective view). In this embodiment, the rotating shade 34 is oriented to form the first passing light distribution pattern by rotating the rotating shade 34 in the orientation to form the low beam light distribution pattern by 60° around the rotating shaft 41 in one of the rotating directions (clockwise in FIG. 5).

The first passing light distribution pattern P1 is a light distribution pattern for alerting another vehicle or pedestrian located around the driver's vehicle. In this embodiment, the first passing light distribution pattern P1 includes illuminated areas above and below the H-H line, like a high beam light distribution pattern Hi. However, the illuminated area above the H-H line is smaller than that of the high beam light distribution pattern Hi. The first passing formation part 34b is formed to have a ridge line shape corresponding to the first passing light distribution pattern P1 as described above.

The bottom row of FIG. 5 shows the high beam light distribution pattern Hi and the orientation of the rotating shade 34 occurring when the high beam light distribution pattern is formed (cross sectional view and perspective view). In this embodiment, the rotating shade 34 is oriented to form the high beam light distribution pattern by rotating the rotating shade 34 in the orientation to form the first passing light distribution pattern by 30° clockwise around the rotating shaft 41.

The high beam light distribution pattern Hi is a light distribution pattern for illuminating a wide range in front and a distance. For example, the high beam light distribution pattern Hi is formed when it is not necessary to care for the glare experienced by a frontward vehicle or a pedestrian. The high beam formation part 34c is formed to be substantially planar. The plane is removed from the light axis Ax by a predetermined distance or more when the high beam light distribution pattern is formed so as to guide the light from the light source 31 and the reflector 33 to the projection lens 36 without shielding the light.

Figure 6:
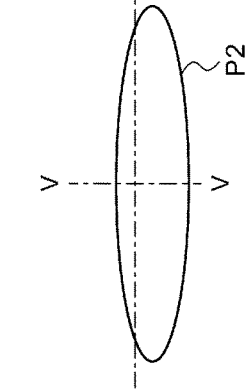
FIG. 6 is a diagram illustrating a light distribution pattern and a ridge line shape of the rotating shade for forming the light distribution pattern.

The top row of FIG. 6 shows a second passing light distribution pattern P2 and the orientation of the rotating shade 34 occurring when the second passing light distribution pattern is formed (cross sectional view and perspective view). In this embodiment, the rotating shade 34 is oriented to form the second passing light distribution pattern by rotating the rotating shade 34 in the orientation to form the high beam light distribution pattern by 30° clockwise around the rotating shaft 41.

The second passing light distribution pattern P2 is also a light distribution pattern for alerting another vehicle or pedestrian located around the driver's vehicle. The second passing light distribution pattern P2 includes illuminated areas above and below the H-H line. The illuminated area above the H-H line is smaller than that of the high beam light distribution pattern Hi. The second passing light distribution pattern P2 may be of a shape identical to or different from that of the first passing light distribution pattern P1 shown in FIG. 5. The second passing formation part 34d is shaped to have a ridge line shape corresponding to the second passing light distribution pattern P2.

The middle row of FIG. 6 shows a first one-sided high beam light distribution pattern $Hi_1$ and the orientation of the rotating shade 34 occurring when the first one-sided high beam light distribution pattern is formed (cross sectional view and perspective view). In this embodiment, the rotating shade 34 is oriented to form the first one-sided high beam light distribution pattern by rotating the rotating shade 34 in the orientation to form the second passing light distribution pattern by 60° clockwise around the rotating shaft 41.

The first one-sided high beam light distribution pattern $Hi_1$ is a light distribution pattern that illuminates the oncoming traffic lane side (to the right of the V-V line) with a low beam and illuminates only the driver's lane side (to the left of the V-V line) with a high beam, while the driver's vehicle is traveling on the left lane. The first one-sided high beam light distribution pattern $Hi_1$ has a diagonal cutoff line in the neighborhood of the V-V line. The first one-sided high beam light distribution pattern $Hi_1$ can be said to be an alternative high beam light distribution pattern in which a light shielding area is provided in a portion of the high beam light distribution pattern Hi. The first one-sided high beam light distribution pattern $Hi_1$ is preferably used when a leading vehicle or a pedestrian is not located in the driver's lane and an oncoming vehicle or a pedestrian is located on the oncoming traffic lane. In this way, the glare is not seen by the oncoming vehicle or the pedestrian and the driver is given a good view by illuminating only the driver's lane side with a high beam.

The first one-sided high beam formation part 34e includes an oncoming lane cutoff line formation part 61 for forming a cutoff line for cutting off the low beam on the oncoming lane side, a driver's lane high beam formation part 62 for forming a high beam on the driver's lane side, and a diagonal cutoff line formation part 63 for forming a diagonal cutoff line.

The bottom of FIG. 6 shows a second one-sided high beam light distribution pattern $Hi_2$ and the orientation of the rotating shade 34 occurring when the second one-sided high beam light distribution pattern is formed (cross sectional view and perspective view). In this embodiment, the rotating shade 34 is oriented to form the second one-sided high beam light distribution pattern by rotating the rotating shade 34 in the orientation to form the first one-sided high beam light distribution pattern by 90° clockwise around the rotating shaft 41.

The second one-sided high beam light distribution pattern $Hi_2$ is an alternative high beam light distribution pattern that illuminates the driver's lane and the oncoming traffic lane with a low beam and illuminates only the side walk side of the driver's lane with a high beam, while the driver's vehicle is traveling on the left lane. The second one-sided high beam light distribution pattern $Hi_2$ has a diagonal cutoff line in the neighborhood of the border between the driver's lane and the side walk, The second one-sided high beam light distribution pattern $Hi_2$ can also be said to be an alternative high beam light distribution pattern in which a light shielding area is provided in a portion of the high beam light distribution pattern Hi. The second one-sided high beam light distribution pattern $Hi_2$ is used for the purpose of increasing the viewability of the side walk on the driver's lane side when vehicles are located on the driver's lane and the oncoming traffic lane.

The second one-sided high beam formation part 34f includes a cutoff line formation part 64 for forming a cutoff line for cutting off the low beam on the driver's lane and the oncoming traffic lane, a side walk high beam formation part 65 for forming a high beam on the side walk side of the driver's lane, and a diagonal cutoff line formation part 66 for forming a diagonal cutoff line.

The first one-sided high beam formation part 34e and the second one-sided high beam formation part 34f are separately described above. In practice, however, the diagonal cutoff line formation part 63 of the first one-sided high beam formation part 34e and the diagonal cutoff line formation part 66 of the second one-sided high beam formation part 34f are continuously formed so that the light shielding area in the high beam light distribution pattern can be variably sized in accordance with the rotation of the rotating shade 34. In other words, the rotating shade 34 is formed so that the position of the diagonal cutoff line formation part is shifted in accordance with the rotation of the rotating shade 34. As a result, the position of the diagonal cutoff line in the one-sided high beam light distribution pattern can be continuously moved from the neighborhood of the V-V line to the border between the driver's lane and the side walk.

For convenience of description, an intermediate one-sided high beam light distribution pattern having a diagonal cutoff line between the diagonal cutoff line of the first one-sided high beam light distribution pattern $Hi_1$ and that of the second one-sided high beam light distribution pattern $Hi_2$ will be generically referred to as a one-sided high beam light distribution pattern $Hi_a$. By rotating the rotating shade 34 and moving the diagonal cutoff line accordingly, the light distribution pattern can be changed from the first one-sided high beam light distribution pattern $Hi_1$ to the second one-sided high beam light distribution pattern $Hi_2$ via the one-sided high beam light distribution pattern $Hi_a$, or from the second one-sided high beam light distribution pattern $Hi_2$ to the first one-sided high beam light distribution pattern $Hi_1$ via the one-sided high beam light distribution pattern $Hi_a$.

The descriptions above with reference to FIGS. 1 through 6 relate to the left lamp structure and the light distribution patterns formed by the left lamp of the pair of automotive lamps. The right lamp forms light distribution patterns that are substantially identical to or substantially horizontally symmetrical with the light distribution patterns described above. The left and right light distribution patterns are each selectable individually. The left and right lamps form the selected light distribution patterns respectively. The left and right light distribution patterns thus formed are superimposed so that the space in front of the driver's vehicle is illuminated.

Figure 7:
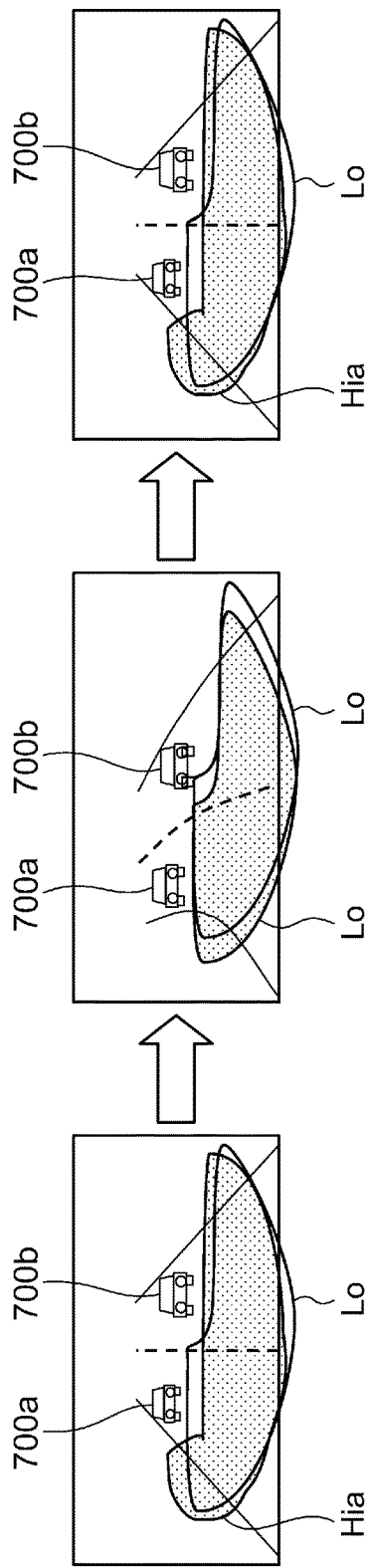
FIGS. 7A-7C are diagrams illustrating an exemplary relationship between a leading vehicle and a light distribution pattern.

FIGS. 7A-7C are diagrams illustrating an exemplary relationship between a leading vehicle and a light distribution pattern. The figures show left-hand traffic and show a scene of travel in which vehicles travel on a four-lane road in which straight lanes and left curves alternate. The two lanes on the driver's side are illustrated. FIG. 7A shows a travel on a straight part, FIG. 7B shows a travel on a left curve part ahead of the straight part, and FIG. 7C shows a travel on a straight part further ahead. Leading vehicles 700a and 700b are traveling on the left lane and the right lane, respectively.

As shown in FIG. 7A, the left light distribution pattern formed by the left lamp is the one-sided high beam light distribution pattern $Hi_a$. The diagonal cutoff line of the one-sided high beam light distribution pattern $Hi_a$ is aligned to the left of the leading vehicle 700a on the left so that the non-illuminated area of the one-sided high beam light distribution pattern $Hi_a$ includes the leading vehicles 700a and 700b. As shown in the figure, a margin of non-illuminated area may be given to the neighborhood of the leading vehicle 700a by positioning the diagonal cutoff line at a certain distance from the leading vehicle 700a. Meanwhile, the right light distribution pattern formed by the right lamp is the low beam light distribution pattern Lo since the leading vehicles 700a and 700b are located.

As the vehicles advance from the straight part to the left curve part of the road, the leading vehicle 700a on the left traveling along the left curve moves left relative to the driver's vehicle, as shown in FIG. 7B. In association with this, the left light distribution pattern adaptively changes from the one-sided high beam light distribution pattern $Hi_a$ to the second one-sided high beam light distribution pattern $Hi_2$ and is ultimately switched to the low beam light distribution pattern Lo so as to avoid illuminating the leading vehicle 700a. The right light distribution pattern remains the low beam light distribution pattern Lo.

As the vehicles travel further and advance from the left curve part to the following straight part, the leading vehicle 700a moves from left to center, as shown in FIG. 7C. The left light distribution pattern is adaptively switched from the low beam light distribution pattern Lo to the second one-sided high beam light distribution pattern $Hi_2$ and adaptively changes to the one-sided high beam light distribution pattern $Hi_a$. As in FIG. 7A, the diagonal cutoff line of the one-sided high beam light distribution pattern $Hi_a$ is aligned to the left of the leading vehicle 700a on the left so that the non-illuminated area of the one-sided high beam light distribution pattern $Hi_a$ includes the leading vehicles 700a and 700b. The right light distribution pattern remains the low beam light distribution pattern Lo also in this case.

In this way, the leading vehicles 700a and 700b move from center to left in the field of view in front of the driver's vehicle or, conversely, from left to center as straight lines and curves are repeated. The leading vehicles 700a and 700b also move from side to side relative to the driver's vehicle by changing lanes. Each time the leading vehicles 700a and 700b move from side to side, light distribution pattern is automatically changed. For example, light distribution is changed from a partially shielded high beam to a low beam or vice-versa.

Therefore, if the leading vehicle 700a moves from side to side about a position of switching between the low beam light distribution pattern Lo and the second one-sided high beam light distribution pattern $Hi_2$, the leading vehicle 700a could frequently travel across the switching position. Each crossing results in switching between a low beam and a high beam. This is a normal operation of the ADB mode but may be annoying for the driver of the driver's vehicle or the driver of the leading vehicle 700a if the frequency of switching is excessively high.

While the ADB mode is being activated, a high beam indicator is turned on if one of the lamps is in a high beam mode or one-sided high beam mode. If both lamps are in a low beam mode, the high beam indicator is turned off. Thus, the high beam indicator is turned on in the situation illustrated in FIG. 7A and turned off in the situation illustrated in FIG. 7B. The high beam indicator is turned on again in the situation illustrated in FIG. 7C.

Therefore, if the mode is switched frequently between a low beam and a high beam, the high beam indicator is also turned on and off repeatedly at the same frequency. While this merely represents the current beam status, excessive flashing may make the driver misunderstand that the flashing is caused by some sort of abnormality in the lamp and feel uneasy.

We have devised the following configuration in order to inhibit too sensitive switching between a low beam and a high beam depending on the movement of the frontward vehicle relative to the driver's vehicle.

Figure 8:
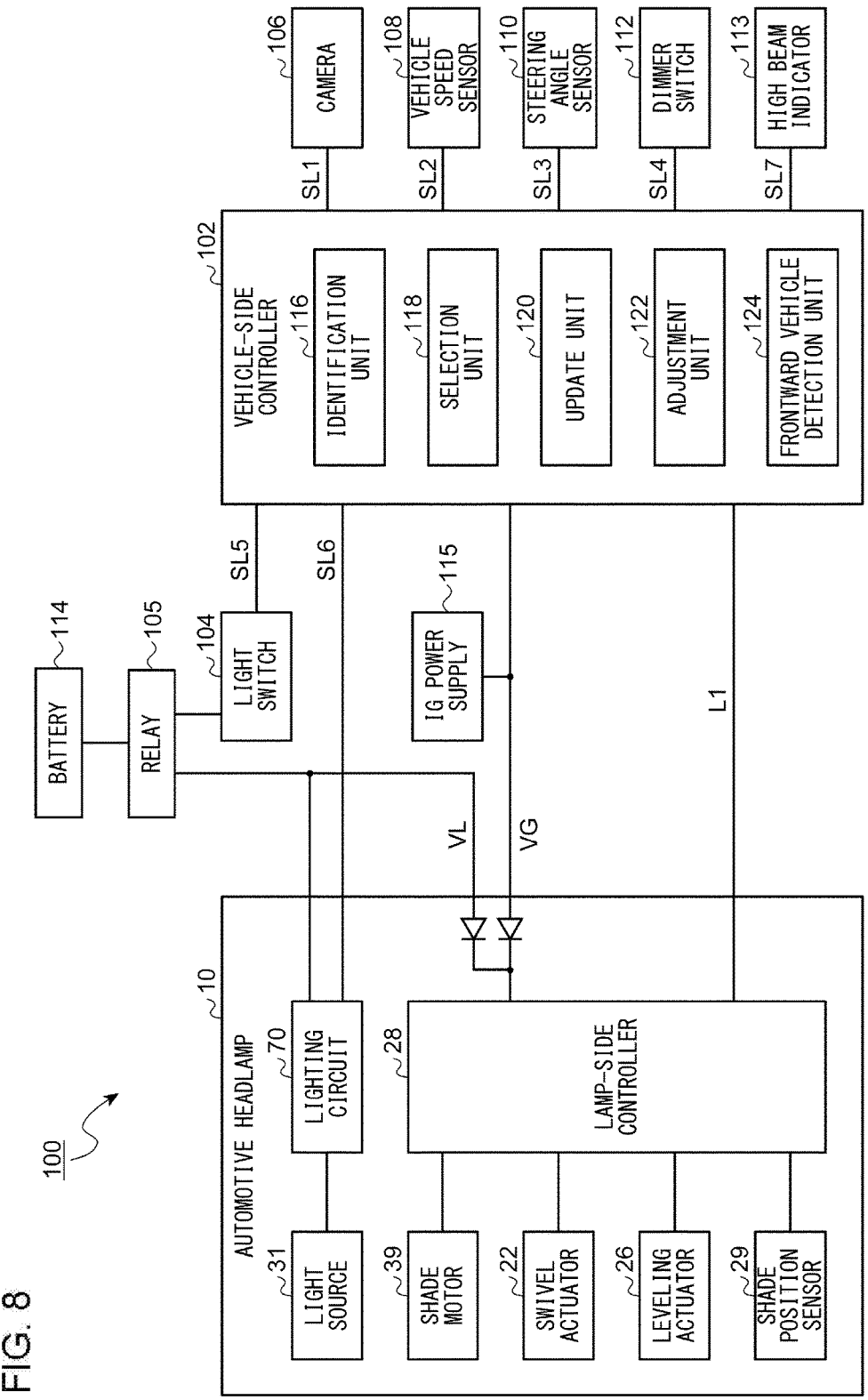
FIG. 8 is a functional block diagram illustrating a light distribution control system for an automotive headlamp according to an embodiment of the invention.

FIG. 8 is a functional block diagram illustrating a light distribution control system 100 for an automotive headlamp according to an embodiment of the invention. The light distribution control system 100 includes the automotive headlamp 10 described above, a vehicle-side controller 102 installed on the vehicle, a light switch 104, a camera 106, a vehicle speed sensor 108, a steering angle sensor 110, a dimmer switch 112, a high beam indicator 113. The automotive headlamp 10 includes a light source 31, a lighting circuit 70 for turning the light source 31 on, a shade motor 39, a swivel actuator 22, a leveling actuator 26, a lamp-side controller 28, and a shade position sensor 29.

The camera 106, the vehicle speed sensor 108, the steering angle sensor 110, a dimmer switch 112, and the light switch 104 transmit information to the vehicle-side controller 102 by using controller area network (CAN) communication. The camera 106 is connected to the vehicle-side controller 102 via a signal line SL1. The vehicle speed sensor 108 is connected to the vehicle-side controller 102 via a signal line SL2. The steering angle sensor 110 is connected to the vehicle-side controller 102 via a signal line SL3. The dimmer switch 112 is connected to the vehicle-side controller 102 via a signal line SL4. The light switch 104 is connected to the vehicle-side controller 102 via a signal line SL5. The high beam indicator 113 is connected to the vehicle-side controller 102 via a signal line SL7. The vehicle-side controller 102 monitors signals of the camera 106, vehicle speed sensor 108, steering angle sensor 110, dimmer switch 112, light switch 104, and high beam indicator 113 on a continuous basis.

Further, the vehicle-side controller 102 monitors the voltage of a power supply 115. The vehicle-side controller 102 is also connected to the lamp-side controller 28 via a signal line L1. The vehicle-side controller 102 and the lamp-side controller 28 transmit information via the signal line L1 by using local interconnect network (LIN) communication. The signal line L1 from the vehicle-side controller 102 is connected to a pair of left and right automotive headlamps 10.

When the light switch 104 is turned on in the light distribution control system 100, a relay 105 is turned on so that a voltage VL is supplied from a battery 114 to the lighting circuit 70 of the automotive headlamp 10, causing the lighting circuit 70 to turn the light source 31 on. When the light switch 104 is turned on, the voltage VL is also supplied from the battery 114 to the lamp-side controller 28 via the relay 105, resetting the lamp-side controller 28. The lighting circuit 70 is connected to the vehicle-side controller 102 via a signal line SL6. The signal line SL6 sends a signal indicating normality of the light source 31 and the lighting circuit 70 to the vehicle-side controller 102. The vehicle-side controller 102 recognizes whether the light source 31 or the lighting circuit 70 is abnormal by referring to the signal.

When an ignition switch (not shown) of the vehicle is turned on, an ignition (IG) power supply 115 supplies a voltage VG to the vehicle-side controller 102, resetting the vehicle-side controller 102. When the ignition switch is turned on, the IG power supply 115 also supplies the voltage VG to the lamp-side controller 28. Therefore, the lamp-side controller 28 is supplied with power both from the battery 114 and the IG power supply 115. The IG power supply 115 is also supplied with power from the battery 114.

The vehicle-side controller 102 receives status signals indicating the traveling condition of the driver's vehicle from the camera 106, vehicle speed sensor 10, steering angle sensor 110, etc. The lamp-side controller 28 is communicably connected to the vehicle-side controller 102 and controls the shade motor 39, swivel actuator 22, and leveling actuator 26 in response to a light distribution direction signal from the vehicle-side controller 102.

The light distribution control system 100 enables manual switching between a low beam light distribution pattern and a high beam light distribution pattern by the driver using the dimmer switch 112. Hereinafter, the mode of manually controlling the light distribution pattern in this way will be referred to as "manual mode." For example, when the driver selects the low beam light distribution pattern, the vehicle-side controller 102 issues an instruction that directs the lamp-side controller 28 to form the low beam light distribution pattern. The lamp-side controller 28 receiving the instruction controls the shade motor 39 to form the low beam light distribution pattern.

The light distribution control system 100 is also capable of forming a light distribution pattern most suitable for the situation around the vehicle without depending on the use of the dimmer switch 112 by detecting the traveling condition of the vehicle using various sensors. Hereinafter, the mode of controlling the light distribution pattern in this way will be referred to as "automatic mode." The automatic mode includes, for example, automatic light distribution control mode, i.e., so-called ADB mode, for detecting the situation around the vehicle using various sensors and forming a light distribution pattern most suitable for the situation around the vehicle. The ADB mode is activated when an instruction for activation of the ADB mode is provided from the light switch 104.

The light distribution control system 100 is configured to work in one of the illumination modes including the manual mode and the automatic mode.

For example, if a frontward vehicle of the driver's vehicle is detected, the vehicle-side controller 102 determines that the glare for the frontward vehicle should be prevented and, for example, directs the lamp-side controller 28 to form the low beam light distribution pattern. If it is detected that there are no vehicles in front, the vehicle-side controller 102 determine that the field of view of the driver should be improved and, for example, directs the lamp-side controller 28 to form the high beam light distribution pattern.

To detect a frontward vehicle, the vehicle-side controller 102 is connected to the camera 106 implemented by, for example, a stereo camera. Image data captured by the camera 106 is transmitted to the vehicle-side controller 102. The vehicle-side controller 102 processes the transmitted signal for image analysis so as to detect a frontward vehicle in the imaging range. The vehicle-side controller 102 selects one most suitable light distribution pattern based on the information on the frontward vehicle thus acquired and directs the lamp-side controller 28 to form the selected light distribution pattern. Means for detecting a frontward vehicle may be modified as appropriate. In place of the camera 106, other detection means such as but not limited to a millimeter radar or infrared radar may be used. Alternatively, multiple means may be used in combination.

Further, the vehicle-side controller 102 is capable of acquiring information from the vehicle speed sensor 108, the steering angle sensor 110, etc. commonly installed in the vehicle. The vehicle-side controller 102 is capable of selecting a light distribution pattern formed depending on the traveling condition or traveling orientation of the vehicle or changing the light distribution pattern by changing the direction of light axis. If the vehicle-side controller 102 determines that the vehicle is in a swivel motion based on the information from the steering angle sensor 110, the vehicle-side controller 102 directs the lamp-side controller 28 to form a light distribution pattern for improving the field of view in the swivel direction. The lamp-side controller 28 receiving the direction controls the swivel actuator 22 to orient the light axis of the lamp unit 30 to the prospective direction of travel. If the vehicle-side controller 102 determines that the vehicle orientation changes by referring to the information from the vehicle speed sensor 108, the vehicle-side controller 102 directs the lamp-side controller 28 to form a light distribution pattern that optimizes the distance of reach of forward illumination. The lamp-side controller 28 receiving the direction controls the leveling actuator 26 according to the forward inclination or backward inclination of the vehicle orientation and adjusts the light axis of the lamp unit 30 in the vertical direction relative to the vehicle.

When the vehicle-side controller 102 directs the associated lamp-side controller 28 so that at least one of the left and right lamp units 30 forms a high beam light distribution pattern, the vehicle-side controller 102 turns the high beam indicator 113 on. Further, when the vehicle-side controller 102 directs both lamp-side controllers 28 so that both of the lamp units 30 form a low beam light distribution pattern, the vehicle-side controller 102 turns the high beam indicator 113 off. Thus, in the manual mode described above, the high beam indicator 113 is turned on and off in association with the manipulation of the dimmer switch 112. In the ADB mode, the high beam indicator 113 is turned on when at least one of the lamp units 30 produces a high beam or a one-sided high beam. When both lamp units 30 produce a low beam, the high beam indicator 113 is turned off.

As would be understood from the description above, the light distribution control system 100 constitutes A vehicular head-lighting system that controls light distribution dynamically to suit the non-illuminated area to the frontward vehicle. The light distribution control system 100 is provided with the automotive headlamp 10 that functions as an automotive lamp capable of forming a plurality of light distribution patterns.

The plurality of light distribution patterns include the low beam light distribution pattern Lo, high beam light distribution pattern Hi, and the adaptive high beam light distribution pattern derived from excluding an area of the frontward vehicle (i.e., the area occupied by the frontward vehicle and the neighborhood thereof) from the high beam light distribution pattern Hi. The one-sided high beam light distribution pattern with a variable illuminated area, which exemplifies the adaptive high beam light distribution pattern, has an illuminated area at least in the first zone. The first zone is set at the first end in the direction of vehicle width as described later. The adaptive high beam light distribution pattern is inclusive of the first one-sided high beam light distribution pattern $Hi_1$, second one-sided high beam light distribution pattern $Hi_2$, and the one-sided high beam light distribution pattern $Hi_a$ having a diagonal cutoff line between the diagonal cutoff lines of these two one-sided high beam light distribution patterns. As described above, these adaptive high beam light distribution patterns are formed by setting the orientation of the rotating shade 34 at a desired angle of rotation between the first one-sided high beam formation part 34e and the second one-sided high beam formation part 34f.

The light distribution control system 100 includes an identification unit 116, a selection unit 118, an update unit 120, an adjustment unit 122 and a frontward vehicle detection unit 124. In the illustrated embodiment, the identification unit 116, the selection unit 118, the update unit 120, the adjustment unit 122 and the frontward vehicle detection unit 124 are provided in the vehicle-side controller 102. In alternative embodiments, at least one of the identification unit 116, the selection unit 118, the update unit 120, the adjustment unit 122 and the frontward vehicle detection unit 124 may be provided in the lamp-side controller 28.

The vehicle-side controller 102, the lamp-side controller 28, etc. are implemented in hardware such as a device or a circuit exemplified by a CPU or a memory of a computer, and in software such as a computer program. FIG. 8 depicts functional blocks implemented by the cooperation of these elements. Therefore, it will be obvious to those skilled in the art that the functional blocks may be implemented in a variety of manners by a combination of hardware and software.

The identification unit 116 is configured to identify a zone in which the frontward vehicle is located from a plurality of zones defined in front of the driver's vehicle, based on a result of detection by a frontward vehicle detection unit 124 including the camera 106, etc. For example, the result of detection by the frontward vehicle detection unit 124 may include the angular coordinates of the frontward vehicle. The selection unit selects, from the plurality of light distribution patterns, a light distribution pattern that should be formed, based on the zone identified by the identification unit 116.

The update unit 120 updates an area of the frontward vehicle (i.e., the area occupied by the frontward vehicle and the neighborhood thereof) based on the result of detection by the frontward vehicle detection unit 124. The adjustment unit 122 adjusts the form or shape of the adaptive high beam light distribution pattern so as to exclude the updated area of the frontward vehicle. The update unit 120 and the adjustment unit 122 may be provided in the selection unit 118.

Figure 9:
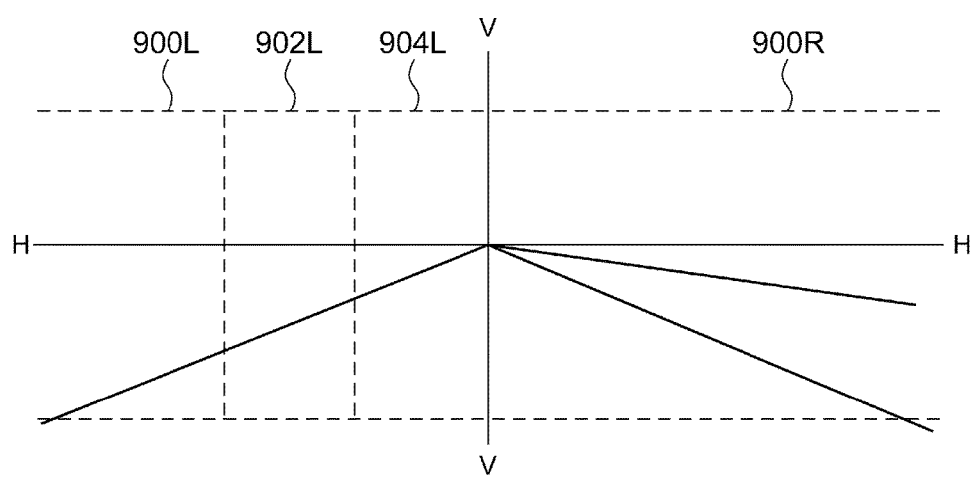
FIG. 9 is schematic diagram illustrating a plurality of zones defined in the field of view in front of the driver's vehicle.

FIG. 9 is a schematic diagram illustrating a plurality of zones defined in the field of view in front of the driver's vehicle. The plurality of zones includes a first zone defined at a first vehicle widthwise end, a transitional zone defined along a second vehicle widthwise end and adjoining the first zone, and a second zone defined along the second vehicle widthwise end and adjoining the transitional zone. These plural zones may be defined individually for the pair of left and right automotive lamps.

According to an example of zone definition shown in FIG. 9, a leftward first zone 900L located at the left end, a left transitional zone 902L adjacent to the leftward first zone 900L to the right, and a leftward second zone 904L adjacent to the left transitional zone 902L to the right are defined for the left lamp. The left half of the space in front of the driver's vehicle is divided into these three zones. With regard to the right lamp, the right half of the space in front of the driver's vehicle is defined as a rightward first zone 900R. In this way, the first zones 900L and 900R are respectively defined for the pair of left and right automotive lamps outward of the left transitional zone 902L in the direction of vehicle width. These zones can be defined as appropriate based on experimental knowledge of a designer or experiments or simulation by the designer.

In addition, a right transitional zone adjacent to the rightward first zone 900R to the left or to the right, and a rightward second zone adjacent to the right transitional zone to the left or to the right may be defined. The rightward first zone 900R and the leftward second zone 904L may be adjacent side to side at the center of the field of view in front of the driver's vehicle or overlap each other in part.

In the example shown in FIG. 9, the border line between two zones is perpendicular to the horizontal line H-H. Alternatively, the border line may have an arbitrary tilt angle with respect to the horizontal line H-H. The border line between two zones may at least partially be aligned with or parallel to the diagonal cutoff line of a one-sided high beam light distribution pattern. Alternatively, the border line may be an arbitrary straight line, polygonal line, curved line, or a combination thereof.

If the identification unit 116 determines that the frontward vehicle is located in the leftward first zone 900L, the selection unit 118 selects the low beam light distribution pattern Lo as the light distribution pattern that the left lamp should form. If the identification unit 116 determines that the frontward vehicle is located in the leftward second zone 904L, the selection unit 118 selects the adaptive high beam light distribution pattern. In other words, if the frontward vehicle is located in the leftward second zone 904L, the first one-sided high beam light distribution pattern $Hi_1$, the second one-sided high beam light distribution pattern $Hi_2$, or the one-sided high beam light distribution pattern $Hi_a$ is selected depending on the location of the frontward vehicle. As described above, the adjustment unit 122 is capable of adaptively changing the first one-sided high beam light distribution pattern $Hi_1$, the second one-sided high beam light distribution pattern $Hi_2$, or the one-sided high beam light distribution pattern $Hi_a$ based on the result of updating by the update unit 120. The selection unit 118 continues the currently selected light distribution pattern if the identification unit 116 determines that the frontward vehicle is located in the left transitional zone 902L.

If the identification unit 116 determines that the frontward vehicle is located in the rightward first zone 900R, the selection unit 118 selects the low beam light distribution pattern Lo as the light distribution pattern that the right lamp should form. As in the case of the left lamp, the selection unit 118 may select the adaptive high beam light distribution pattern if the identification unit 116 determines that the frontward vehicle is located in the rightward second zone, and continue the currently selected light distribution pattern if the identification unit 116 determines that the frontward vehicle is located in the right transitional zone.

FIGS. 10A-10F are diagrams illustrating the relationship between a leading vehicle and a light distribution pattern according to an embodiment of the invention. The figures show a left-hand traffic and shows a scene of travel in which vehicles travel on a four-lane road in which straight lanes and left curves alternate. Leading vehicles 700a and 700b are traveling on the left lane and the right lane, respectively.

FIG. 10A shows a travel on a left curve part, FIGS. 10B through 10E show a travel on a straight part ahead, and FIG. 10F shows a travel on a left curve part further ahead. FIGS. 10A through 10C show that the leading vehicle 700a on the left is gradually moving rightward in this scene of travel. As the time elapses through FIGS. 10A, 10B, and 10C, the leading vehicle 700a is moving from the leftward first zone 900L to the left transitional zone 902L and the leftward second zone 904L described with reference to FIG. 9. FIGS. 10D through 10F show that the leading vehicle 700a is returning left. As the time elapses through FIGS. 10D, 10E, and 10F, the leading vehicle 700a is returning from the leftward second zone 904L to the left transitional zone 902L and the leftward first zone 900L. The bottom of FIGS. 10A through 10F shows whether the high beam indicator 113 is turned on or off concurrently.

As shown in FIG. 10A, the leading vehicle 700a on the left traveling along the left curve is traveling on the left of the driver's vehicle. As described above, the leading vehicle 700a is located in the leftward first zone 900L. For this reason, the left light distribution pattern formed by the left lamp is the low beam light distribution pattern Lo. At this point of time, the leading vehicle 700b on the right is located in the rightward first zone 900R so that the right light distribution pattern formed by the right lamp is also the low beam light distribution pattern Lo. Since the low beam light distribution pattern Lo is formed on both the left and right sides, the high beam indicator 113 is turned off. Following this, the right light distribution pattern continues to be the low beam light distribution pattern Lo through FIG. 10F.

As the vehicles advance from the left curve part to the straight part of the road, the leading vehicle 700a moves right relative to the driver's vehicle. Even when the leading vehicle 700a enters the left transitional zone 902L from the leftward first zone 900L, the selection unit 118 continues the low beam light distribution pattern Lo currently in use, as shown in FIG. 10B. As will be understood by referring to FIGS. 7A and 7C, it is possible to turn the one-sided high beam light distribution pattern $Hi_a$ on without illuminating the leading vehicle 700a in the situation of FIG. 10B. Regardless, the low beam is maintained.

Only when the leading vehicle 700a further moves right and enters the leftward second zone 904L from the left transitional zone 902L, the left light distribution pattern is promptly switched from the low beam light distribution pattern Lo to the one-sided high beam light distribution pattern $Hi_a$, as shown in FIG. 10C. The diagonal cutoff line of the one-sided high beam light distribution pattern $Hi_a$ is aligned to the left of the leading vehicle 700a on the left so that the non-illuminated area of the one-sided high beam light distribution pattern $Hi_a$ includes the leading vehicles

700a and 700b. As shown in the figure, a margin of non-illuminated area may be given to the left of the leading vehicle 700a by positioning the diagonal cutoff line at a certain distance from the leading vehicle 700a. By turning the one-sided high beam on, the high beam indicator 113 is turned on.

Thus, the left light distribution pattern is switched when the leading vehicle 700a is located toward the center where the shape of the one-sided high beam light distribution pattern $Hi_a$ can be formed positively. As described with reference to FIGS. 7B and 7C, the left light distribution pattern is not switched to the second one-sided high beam light distribution pattern $Hi_2$ immediately when the leading vehicle 700a moves to the location where the leading vehicle 700a is not illuminated even if the second one-sided high beam light distribution pattern $Hi_2$ with the minimum illuminated area is activated.

So long as the leading vehicle 700a remains in the leftward second zone 904L, the one-sided high beam light distribution pattern $Hi_a$ is maintained, as shown in FIG. 10D. The diagonal cutoff line of the one-sided high beam light distribution pattern $Hi_a$ moves from side to side to adapt to the movement of the leading vehicle 700a. When the leading vehicle 700a moves left and returns to the left transitional zone 902L from the leftward second zone 904L, the current light distribution pattern, i.e., the one-sided high beam light distribution pattern $Hi_a$ is maintained as shown in FIG. 10E so that the diagonal cutoff line moves left, following the leading vehicle 700a. The high beam indicator 113 remains turned on.

As the vehicles advance from the straight part to the left curve part of the road, the leading vehicle 700a moves left relative to the driver's vehicle, as shown in FIG. 10F. In association with this, the left light distribution pattern changes adaptively from the one-sided high beam light distribution pattern $Hi_a$ to the second one-sided high beam light distribution pattern $Hi_2$ and is ultimately switched to the low beam light distribution pattern Lo to avoid illuminating the leading vehicle 700a. Since the low beam light distribution pattern Lo is formed on both the left and right sides, the high beam indicator 113 is turned off.

The position of the frontward vehicle where the low beam is switched to the one-sided high beam is different from the position of the frontward vehicle where the one-sided high beam is switched to the low beam. The former is located toward the center, and the latter is located more toward the end. This gives a sort of hysteresis effect to the operation of switching between the low beam and the one-sided high beam.

When the leading vehicle 700a moves relatively greatly from side to side, the light distribution pattern is appropriately switched from the low beam light distribution pattern Lo to the one-sided high beam light distribution pattern $Hi_a$ or vice versa depending on the position of the vehicle. Therefore, the related-art advantages of ADB control such as securing of a deep field of view ahead the driver's vehicle and reduction of the glare for the frontward vehicle can be enjoyed.

Meanwhile, the original light distribution pattern is maintained if the movement of the leading vehicle 700a is small. For example, as is understood from FIGS. 10A, 10B, and 10F, the light distribution pattern is not switched and the low beam is maintained if the leading vehicle 700a moves from the first zone to the transitional zone and returns to the first zone. Accordingly, the high beam indicator 113 remains turned off through this reciprocal movement. As is understood from FIGS. 10C, 10D, and 10E, the one-sided high beam is maintained and the high beam indicator 113 remains turned on if the leading vehicle 700a moves from the second zone to the transitional zone and returns to the second zone. In this way, the frequency of switching light distribution is controlled and excessive flashing of the high beam indicator 113 is prevented.

Figure 11:
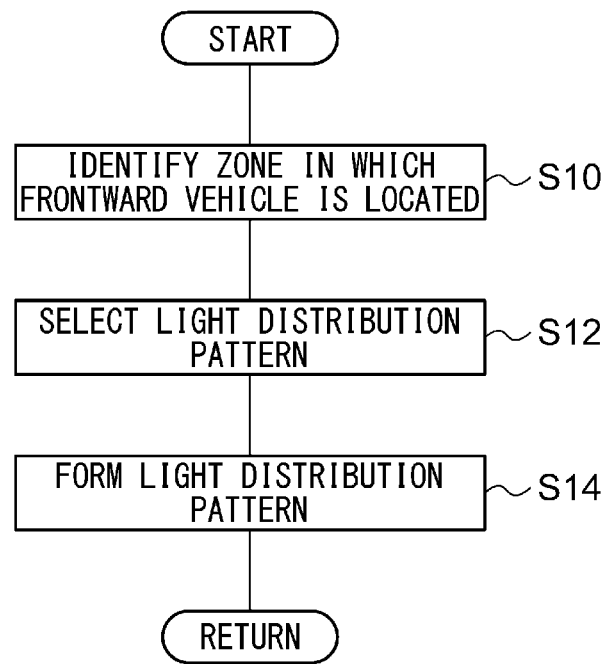
FIG. 11 is a flowchart showing exemplary control executed by the automotive lamp system according to an embodiment of the invention.

FIG. 11 is a flowchart showing exemplary control executed by the automotive lamp system according to an embodiment of the invention. This flow is started when an instruction for execution of the ADB mode is given by the light switch 104 and repeated according to a predetermined timing schedule. Also, the flow is individually executed for the pair of automotive lamps.

As shown in FIG. 11, the vehicle-side controller 102 identifies a zone in which the frontward vehicle is located from a plurality of zones defined in front of the driver's vehicle (S10). The plurality of zones may include an end zone, a central zone, and an intermediate zone sandwiched by these zones in the field of view in front of the driver's vehicle. The end zone, the central zone, and the intermediate zone correspond to the first zone, the second zone, and the transitional zone described above, respectively. The vehicle-side controller 102 identifies the general location of the frontward vehicle based on the result of detection by the frontward vehicle detection unit 124 including a detection means such as but not limited to the camera 106 or a millimeter radar or infrared radar and the sensors.

The vehicle-side controller 102 selects a light distribution pattern that the automotive lamp should form from a plurality of light distribution patterns that the automotive lamp is capable of forming (S12). The vehicle-side controller 102 selects a light distribution pattern depending on the zone identified as being the zone in which the frontward vehicle is located. More specifically, if the frontward vehicle is identified as being located in the end zone, the vehicle-side controller 102 selects the low beam light distribution pattern. If the frontward vehicle is identified as being located in the central zone, the vehicle-side controller selects the adaptive high beam light distribution pattern. If the frontward vehicle is identified as being located in the intermediate zone, the vehicle-side controller 102 maintains the currently selected light distribution pattern. While the adaptive high beam light distribution pattern is being selected, the vehicle-side controller 102 updates the area of the frontward vehicle excluded from the adaptive high beam light distribution pattern based on the result of detection by the frontward vehicle detection unit 124 so that the updated area of the frontward vehicle is not illuminated. The vehicle-side controller 102 adjusts the shape of the adaptive high beam light distribution pattern so as to exclude the area of the frontward vehicle as updated. The vehicle-side controller 102 generates a light distribution direction signal indicating the light distribution pattern that should be formed and transmits the signal to the lamp-side controller 28.

The lamp-side controller 28 forms a light distribution pattern in accordance with the light distribution direction signal received (S14). The lamp-side controller 28 transmits a control signal to the shade motor 39, the swivel actuator 22, the leveling actuator 26, etc. to request formation of the light distribution pattern and terminates the routine.

As described above, the embodiment inhibits highly frequent switching between a high beam and a low beam that could occur when a vehicle under ADB control is traveling on a road of four lanes or more in which straight parts and curves alternate. A sense of discomfort (e.g., annoying feeling) felt in the driver's vehicle, the frontward vehicle, or other users in the traffic caused by excessive switching is reduced, and the high beam indicator is inhibited from being turned on or off frequently.

Figure 12A:
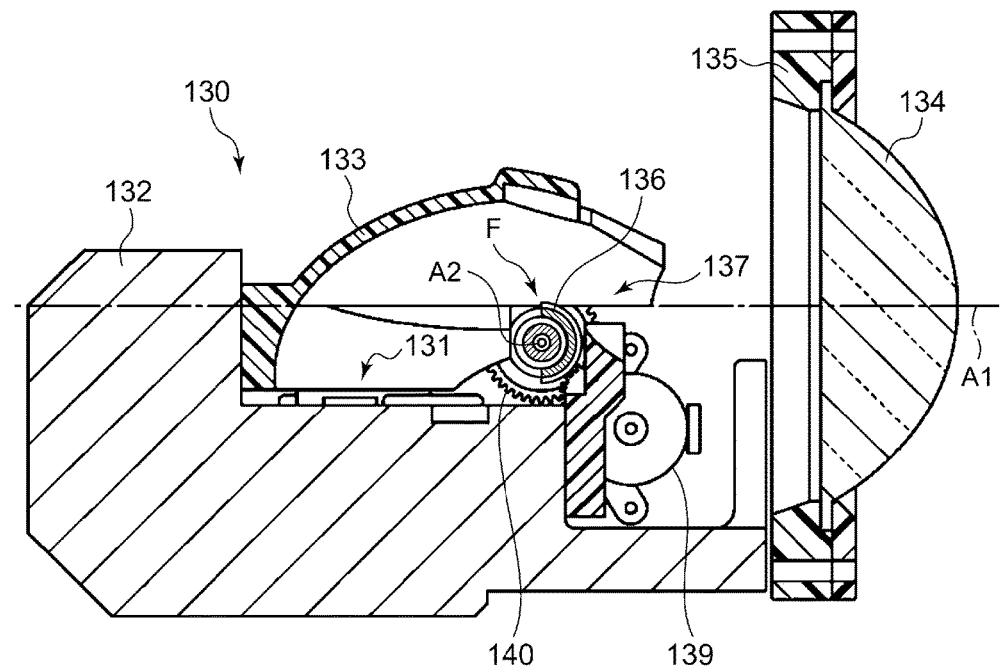
FIGS. 12A and 12B are diagrams illustrating another embodiment of the lamp unit.
Figure 12B:
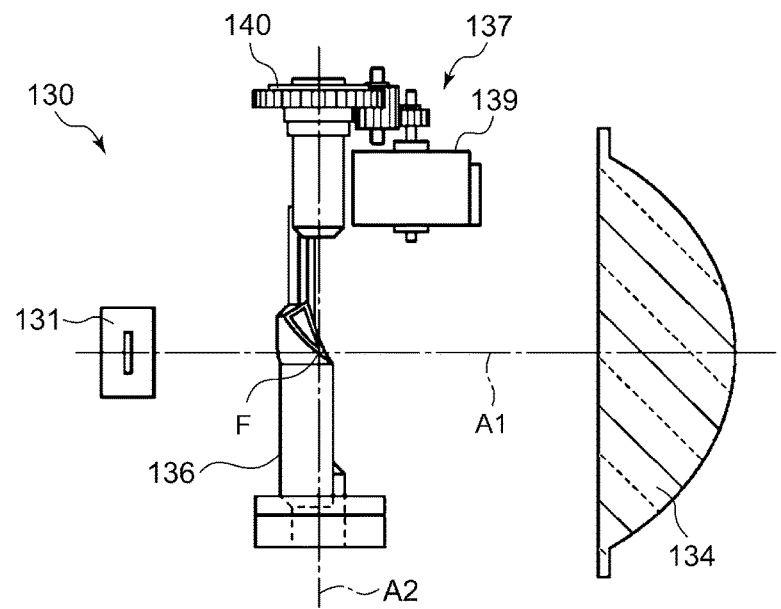

FIGS. 12A and 12B are diagrams illustrating another embodiment of the lamp unit. FIG. 12A is a vertical cross sectional view showing relative positions of some of the elements constituting the lamp unit 130. FIG. 12B is a top view showing relative positions of some of the elements constituting the lamp unit 130.

The lamp unit 130 shown in FIGS. 12A and 12B differ from the lamp unit 30 shown in FIG. 1 in that a light emitting diode (LED) is used as a light source. The lamp unit 130 includes an LED 131, a heat sink 132, a reflector 133, a projection lens 134, a lens holder 135, and a shade mechanism 137. The shade mechanism 137 includes a rotating shade 136, a shade motor 139, and a gear mechanism 140.

The LED 131 is fixed to the heat sink 132. The heat sink 132 is of a material and a shape suitable to dissipate the heat generated by the LED 131. The light emitted by the LED 131 is reflected by the reflector 133 and travels forward. At least a portion of the light passes through the projection lens 134 located in front of the reflector 133.

The reflector 133 has a reflective surface that is a substantially oval surface formed around the light axis A1 extending in a front-back direction of the vehicle. The LED 131 is located at the first focal point of the ellipse forming the vertical cross section of the reflective surface. This ensures that the light emitted by the LED 131 converges on the second focal point of the ellipse.

The projection lens 134 is made of resin and is a plano-convex aspherical lens having a convex front surface and a flat rear surface. The projection lens 134 is located such that the rear focal point F coincides with the second focal point of the reflective surface of the reflector 133 and is configured to project an image on the rear focal point F to a space in front of the vehicle as an inverted image. The peripheral border of the projection lens 134 is supported by the lens holder 135 and is fixed to the heat sink 132.

The rotating shade 136 is located behind the projection lens 134 so as to shield a portion of the light emitted from the LED 131. The rotating shade 136 has a rotating shaft A2. The rotating shaft A2 is arranged to pass through the space below the rear focal point F of the projection lens 134. The shade motor 139 and the gear mechanism 140 rotate the rotating shade 136 around the rotating shaft A2. The shade motor 139 may be implemented by, for example, a stepping motor. The rotation of the shade motor 39 is controlled by the lamp-side controller 28 (see FIGS. 1, 7). The ridge line shape of the rotating shade 136 is designed such that the manner of shielding the light from the reflector 133 is changed depending on the rotational position. Therefore, the light distribution pattern formed in front of the vehicle can be changed by changing the rotational position of the rotating shade 136.

Described above is an explanation based on an exemplary embodiment. The embodiment is intended to be illustrative only and it will be obvious to those skilled in the art that various modifications to constituting elements and processes could be developed and that such modifications are also within the scope of the present invention.

What is claimed is:

1. A vehicular head-lighting system comprising:
    vehicular head-lighting enabled for forming a plurality of light distribution patterns;
    an identification unit that from a plurality of zones defined in front of a driver's vehicle identifies a zone in which a frontward vehicle is located; and a selection unit that in accordance with the zone identified by the identification unit selects from the plurality of light distribution patterns a light distribution pattern that is to be formed; wherein
    the plurality of zones includes a first zone defined at a first vehicle widthwise end, a transitional zone defined along a second vehicle widthwise end and adjoining the first zone, and a second zone defined along the second vehicle widthwise end and adjoining the transitional zone;
    the plurality of light distribution patterns includes a low beam light distribution pattern and an adaptive high beam light distribution pattern having an illuminated area at least in the first zone, and derived by excluding a frontward-vehicle area from a high beam light distribution pattern; and
    the selection unit
        selects the low beam light distribution pattern when the identification unit identifies the frontward vehicle as being located in the first zone,
        selects the adaptive high beam light distribution pattern when the identification unit identifies the frontward vehicle as being located in the second zone, and maintains the currently selected light distribution pattern when the identification unit identifies the frontward vehicle as being located in the transitional zone,
    wherein the selection unit selects the low beam light distribution pattern during widthwise reciprocation of the frontward-vehicle between the first zone and the transitional zone,
    the vehicular head-lighting system further comprises:
        an update unit that updates the frontward-vehicle area based on detection results by a frontward vehicle detection unit; and
        an adjustment unit that, during widthwise reciprocation of the frontward vehicle between the second zone and the transitional zone, adjusts a form of the adaptive high beam light distribution pattern so as to exclude the updated frontward-vehicle area.

2. The vehicular head-lighting system according to claim 1, wherein the vehicular head-lighting is a pair of vehicular lamps arranged on the left and right of the vehicle, and for each of the pair of vehicular lamps the first zone is defined outside the transitional zone widthwise along the vehicle.

3. The vehicular head-lighting system according to claim 1, wherein the vehicular head-lighting is a pair of vehicular lamps arranged on the left and right of the vehicle, and for each of the pair of vehicular lamps the first zone is defined outside the transitional zone widthwise along the vehicle.

4. The vehicular head-lighting system according to claim 1, further comprising:
    a frontward vehicle detection unit that detects a frontward vehicle in front of the driver's vehicle, wherein
    the identification unit is configured to identify the zone in which said frontward vehicle is located based on detection results by the frontward vehicle detection unit.

* * * * *